United States Patent
Su et al.

(10) Patent No.: US 12,033,621 B2
(45) Date of Patent: Jul. 9, 2024

(54) METHOD FOR SPEECH RECOGNITION BASED ON LANGUAGE ADAPTIVITY AND RELATED APPARATUS

(71) Applicant: Tencent Technology (Shenzhen) Company Limited, Shenzhen (CN)

(72) Inventors: Dan Su, Shenzhen (CN); Tianxiao Fu, Shenzhen (CN); Min Luo, Shenzhen (CN); Qi Chen, Shenzhen (CN); Yulu Zhang, Shenzhen (CN); Lin Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 481 days.

(21) Appl. No.: 17/231,945

(22) Filed: Apr. 15, 2021

(65) Prior Publication Data

US 2021/0233521 A1    Jul. 29, 2021

Related U.S. Application Data

(63) Continuation of application No. PCT/CN2020/078806, filed on Mar. 11, 2020.

(30) Foreign Application Priority Data

Mar. 11, 2019 (CN) .......................... 201910182266.5

(51) Int. Cl.
*G10L 15/187* (2013.01)
*G10L 15/00* (2013.01)
(Continued)

(52) U.S. Cl.
CPC .......... *G10L 15/187* (2013.01); *G10L 15/005* (2013.01); *G10L 15/02* (2013.01);
(Continued)

(58) Field of Classification Search
None
See application file for complete search history.

(56) References Cited

U.S. PATENT DOCUMENTS

| | | | |
|---|---|---|---|
| 2005/0197837 A1 | 9/2005 | Suontausta et al. | |
| 2009/0112599 A1* | 4/2009 | Ljolje | G10L 15/222 704/E15.001 |

(Continued)

FOREIGN PATENT DOCUMENTS

| | | | |
|---|---|---|---|
| CN | 103065622 A | 4/2013 | |
| CN | 103400577 A | 11/2013 | |

(Continued)

OTHER PUBLICATIONS

Zhanyu Ma et al., "Language Identification with Deep Bottleneck Features," (arXiv:1809.08909v2 [cs.CL] Feb. 2, 2020), Sep. 18, 2018, 8 pgs.

(Continued)

*Primary Examiner* — Quynh H Nguyen
(74) *Attorney, Agent, or Firm* — Morgan, Lewis & Bockius LLP

(57) ABSTRACT

A method for speech recognition based on language adaptivity comprises obtaining voice data of a user. The method also comprises extracting, based on the obtained voice data, a phoneme feature representing pronunciation phoneme information. The phoneme feature is input to a pre-trained language discrimination model that is pre-trained based on a multilingual corpus. A language discrimination result corresponding to the phoneme feature and in accordance with the language discrimination model is obtained. The method also comprises obtaining a speech recognition result of the voice data based on a language acoustic model of a language corresponding to the language discrimination result. The method further comprises determining a speech (Continued)

recognition result of the voice data based on a language acoustic model of a language corresponding to the language discrimination result.

17 Claims, 7 Drawing Sheets

(51) Int. Cl.
   G10L 15/02 (2006.01)
   G10L 15/06 (2013.01)
   G10L 15/22 (2006.01)

(52) U.S. Cl.
   CPC ............ G10L 15/063 (2013.01); G10L 15/22 (2013.01); *G10L 2015/025* (2013.01)

(56) References Cited

U.S. PATENT DOCUMENTS

| | | | |
|---|---|---|---|
| 2017/0084267 A1* | 3/2017 | Shin | ............... G10L 15/30 |
| 2018/0137109 A1 | 5/2018 | Mangoubi et al. | |

FOREIGN PATENT DOCUMENTS

| | | |
|---|---|---|
| CN | 108510976 A | 9/2018 |
| CN | 108682417 A | 10/2018 |
| CN | 108872834 A | 11/2018 |
| CN | 108986791 A | 12/2018 |
| CN | 109117484 A | 1/2019 |
| CN | 109192192 A | 1/2019 |
| CN | 109359307 A | 2/2019 |
| CN | 110491382 A | 11/2019 |

OTHER PUBLICATIONS

Luis Murphy Marcos et al., "Multi-Lingual Deep Neural Networks for Language Recognition," 2016 IEEE Spoken Language Technology Workshop (SLT), Dec. 31, 2016, Retrieved from the Internet: https://ieeexplore.ieee.org/document/7846285.

Tencent Technology, ISR, PCT/CN2020/078806, Jun. 12, 2020, 3 pgs.

Tencent Technology, WO, PCT/CN2020/078806, Jun. 12, 2020, 5 pgs.

Tencent Technology, IPRP, PCT/CN2020/078806, Aug. 25, 2021, 6 pgs.

* cited by examiner

METHOD FOR SPEECH RECOGNITION BASED ON LANGUAGE ADAPTIVITY AND RELATED APPARATUS

CROSS-REFERENCE TO RELATED APPLICATIONS

This application is a continuation application of PCT Patent Application No. PCT/CN2020/078806, entitled "METHOD FOR PERFORMING SPEECH RECOGNITION BASED ON SELF-ADAPTIVE LANGUAGE, AND RELATED APPARATUS" filed on Mar. 11, 2020, which claims priority to Chinese Patent Application No. 201910182266.5, entitled "METHOD AND APPARATUS FOR SPEECH RECOGNITION BASED ON LANGUAGE ADAPTIVITY, AND DEVICE", filed with the State Intellectual Property Office of the People's Republic of China on Mar. 11, 2019, all of which are incorporated herein by reference in their entirety.

FIELD OF THE TECHNOLOGY

This application relates to the field of computer application technologies, and in particular, to a speech recognition technology.

BACKGROUND OF THE DISCLOSURE

With the rapid development of speech recognition technologies, the accuracy of current speech recognition has reached the level of actual applications, so that the speech recognition (e.g., recognition and interpretation of speech, providing responses to speech, such as in the form of text and/or audio outputs etc.) becomes one of the important interfaces for human-computer interaction, and is widely applied to various scenarios such as voice input, a voice search, voice translation, and a smart home. Meanwhile, an increasing quantity of users use the speech recognition technology. Because the users may come from different countries and use different languages, a speech recognition model is required to support speech recognition in different languages.

At present, multilingual speech recognition is supported by using a hybrid acoustic pronunciation unit set including a plurality of languages while training an acoustic model. Because pronunciations in different languages are directly mixed with each other, an accuracy rate of speech recognition in different languages is greatly affected, resulting in worse user experience.

SUMMARY

In view of the problem of a relatively low recognition accuracy rate of multilingual speech recognition in the related art, this application provides a method for speech recognition based on language adaptivity and a related apparatus.

According to some embodiments of this application, a method for speech recognition based on language adaptivity is provided. The method comprises: obtaining voice data of a user; extracting, based on the obtained voice data, a phoneme feature representing pronunciation phoneme information; inputting the phoneme feature to a pre-trained language discrimination model that is pre-trained based on a multilingual corpus; determining a language discrimination result corresponding to the phoneme feature and in accordance with the language discrimination model; and obtaining a speech recognition result of the voice data based on a language acoustic model of a language corresponding to the language discrimination result.

According to the embodiments of this application, an apparatus for speech recognition based on language adaptivity is further provided, including: an extraction module, configured to extract, based on obtained voice data, a phoneme feature representing pronunciation phoneme information; a discrimination module, configured to input the phoneme feature to a language discrimination model obtained through pre-training based on a multilingual corpus, to obtain a language discrimination result of the voice data; and a recognition module, configured to obtain a speech recognition result of the voice data based on a language acoustic model of a language corresponding to the language discrimination result.

According to the embodiments of this application, a speech recognition method based on artificial intelligence is further provided, including:
 training a plurality of language acoustic models by respectively using corpora of languages as input, the plurality of language acoustic models respectively corresponding to different languages;
 extracting phoneme features of the corpora of the languages respectively by using the plurality of language acoustic models, and training a language discrimination model based on the phoneme features; and
 performing speech recognition on collected voice data based on the plurality of language acoustic models and the language discrimination model.

According to the embodiments of this application, a speech recognition apparatus based on artificial intelligence is provided, including:
 an acoustic model unit, configured to train a plurality of language acoustic models by respectively using corpora of languages as input, the plurality of language acoustic models respectively corresponding to different languages;
 a discrimination model unit, configured to extract phoneme features of the corpora of the languages respectively by using the plurality of language acoustic models, and train a language discrimination model based on the phoneme features; and
 a recognition module, configured to perform speech recognition on collected voice data based on the plurality of language acoustic models and the language discrimination model.

According to some embodiments of this application, a non-transitory computer-readable storage medium is provided. The non-transitory computer-readable storage medium stores a computer program that, when executed by a processor of a computer system (e.g., an electronic device), cause the processor to implement any of the methods disclosed herein.

According to some embodiments of this application, a computer system (e.g., an electronic device) is provided, including a processor and memory. The memory stores computer-readable instructions, which, when executed by the processor, cause the processor to implement any of the methods disclosed herein.

According to some embodiments of this application, a speech interaction device is further provided, including: a collection unit, configured to collect voice data of a user; a processing unit, configured to extract, based on the voice data, a phoneme feature representing pronunciation phoneme information; input the phoneme feature to a language discrimination model obtained through pre-training based on a multilingual corpus, to obtain a language discrimination result of the voice data; and obtain a speech recognition result of the voice data based on a language acoustic model of a language corresponding to the language discrimination result; and an interaction unit, configured to present corresponding interaction content to the user based on the speech recognition result of the processing unit.

Based on the foregoing embodiments, in the solution for speech recognition based on language adaptivity, language discrimination (e.g., differentiating between different languages) is performed through the extracted phoneme feature, thereby switching to the language acoustic model of the language corresponding to the language discrimination result, and the speech recognition result of the voice data is obtained based on the language acoustic model of the language corresponding to the language discrimination result. According to different languages, speech recognition may be performed by automatically switching to different language acoustic models, thereby avoiding the problem of a relatively low recognition rate caused by confusion between pronunciations in different languages, thereby improving processing efficiency while ensuring an accuracy rate of speech recognition. In addition, unnecessary operations caused by language selection performed by the user are omitted, and processing efficiency and user experience are improved.

It is to be understood that the foregoing general descriptions and the following detailed descriptions are only exemplary, and cannot limit this application.

BRIEF DESCRIPTION OF THE DRAWINGS

The accompanying drawings, which are incorporated herein and constitute a part of this specification, illustrate embodiments consistent with this application and, together with the specification, serve to explain the principles of this application.

DESCRIPTION OF EMBODIMENTS

Figure 1:
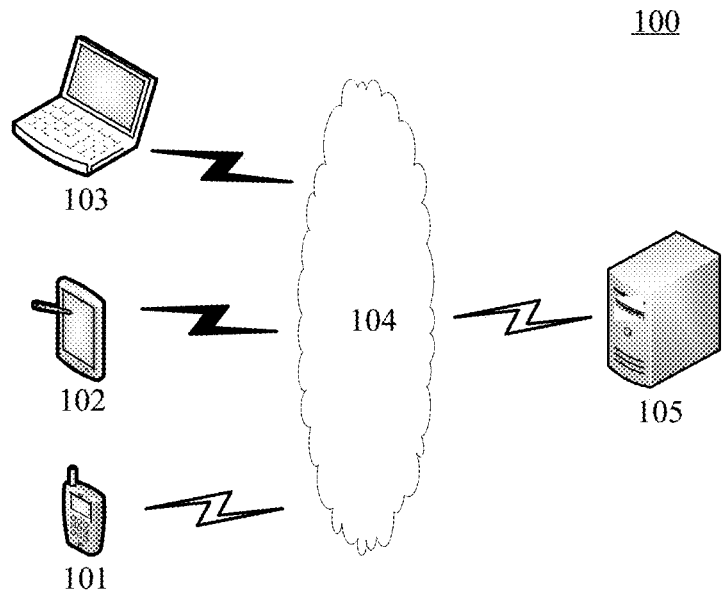
FIG. 1 is a schematic diagram of a system architecture according to some embodiments.

Exemplary implementations are described comprehensively with reference to the accompanying drawings in this part. However, the exemplary embodiments can be implemented in various forms and are not be understood as being limited to examples herein. Conversely, the examples of implementations are provided to make the technical solution of this application more comprehensive and complete, and comprehensively convey the idea of the examples of the implementations to a person skilled in the art.

In addition, the described features, structures, or characteristics may be combined in one or more embodiments in any appropriate manner. In the following descriptions, a lot of specific details are provided to give a full understanding of the embodiments of this application. However, a person skilled in the art is to be aware of that, the technical solutions in this application may be implemented without one or more of the particular details, or other methods, unit, apparatus, or step may be adopted. In other cases, well-known methods, apparatuses, implementations, or operations are not shown or described in detail, to avoid obscuring aspects of this application.

The block diagrams shown in the accompany drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

It is to be emphasized that, a method for speech recognition based on language adaptivity provided in the embodiments of this application may be implemented based on artificial intelligence. Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline, and relates to a wide range of fields including a hardware-level technology and a software-level technology. The basic AI technology generally includes technologies such as a sensor, a dedicated AI chip, cloud computing, distributed storage, a big data processing technology, an operating/interaction system, and electromechanical integration. AI software technologies mainly include several major directions such as a computer vision technology, a speech technology, a natural language processing technology, and machine learning (ML)/deep learning.

Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

Machine learning (ML) is a multi-field interdisciplinary subject involving the probability theory, statistics, the approximation theory, convex analysis, the algorithm complexity theory, and the like. ML specializes in studying how a computer simulates or implements a human learning behavior to obtain new knowledge or skills, and reorganize an existing knowledge structure to keep improving its performance. ML is a core of the AI, is a basic way to make the computer intelligent, and is applied to various fields of the AI. ML and deep learning generally include technologies such as an artificial neural network, a belief network, reinforcement learning, transfer learning, inductive learning, and learning from demonstrations.

With the research and progress of the AI technology, the AI technology is studied and applied to a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this application involve technologies such as a speech, and machine learning/deep learning of AI, and are specifically described by using the following embodiments.

The solutions provided in the embodiments of this application may be executed by an electronic device with a speech recognition function based on language adaptivity, and the electronic device may be a terminal device, or may be a server.

The implementation details of the technical solution of this embodiment of this application are described in detail in the following.

Using an example in which a speech processing device is a server, FIG. 1 is a schematic diagram of an exemplary system architecture 100 in accordance with some embodiments.

As shown in FIG. 1, the system architecture 100 may include one or more of terminal devices 101, 102, and 103, a network 104, and a server 105. The network 104 is a medium configured to provide communication links between the terminal devices 101, 102, and 103, and the server 105. The network 104 may include various connection types, for example, a wired or wireless communication link, or an optical fiber cable.

It is to be understood that the quantity of terminal devices, the quantity of networks, and the quantity of servers in FIG. 1 are merely illustrative. There may be any quantity of terminal devices, any quantity of networks, and any quantity of servers according to an implementation requirement. For example, the server 105 may be a server cluster including a plurality of servers or the like.

A user may interact with the server 105 through the network 104 by using the terminal devices 101, 102, and 103, to receive or send messages. The terminal device 101, 102, 103 may be various electronic devices having display screens, including but not limited to a smartphone, a tablet computer, a portable computer, a desktop computer, or the like.

The server 105 may be a server providing various services. For example, the terminal device 101 may collect voice of a user by using a voice collection module, convert the voice into a digital data form (that is, voice data), and transmit the voice data to the server 105 through the network 104. Next, the server 105 may extract, based on the obtained voice data, a phoneme feature representing pronunciation phoneme information, where the phoneme feature may present features of pronunciation phonemes in different languages. The phoneme feature is inputted to a language discrimination model obtained through pre-training based on a multilingual corpus, to obtain a language discrimination result of the voice data. Then, a speech recognition result of the voice data is obtained based on a language acoustic model of a language corresponding to the language discrimination result, and is returned to the terminal device 101 through the network 104.

In some embodiments, a method for speech recognition based on language adaptivity provided in the embodiments of this application may be performed by the server 105. Correspondingly, an apparatus for speech recognition based on language adaptivity may be disposed in the server 105. In some other embodiments, some terminal devices may have functions similar to those of the server to perform the method. Therefore, the method provided in the embodiments of this application does not need to be strictly limited to execution on a server side, that is, an electronic device with a speech recognition function based on language adaptivity may be a terminal device.

Figure 2:
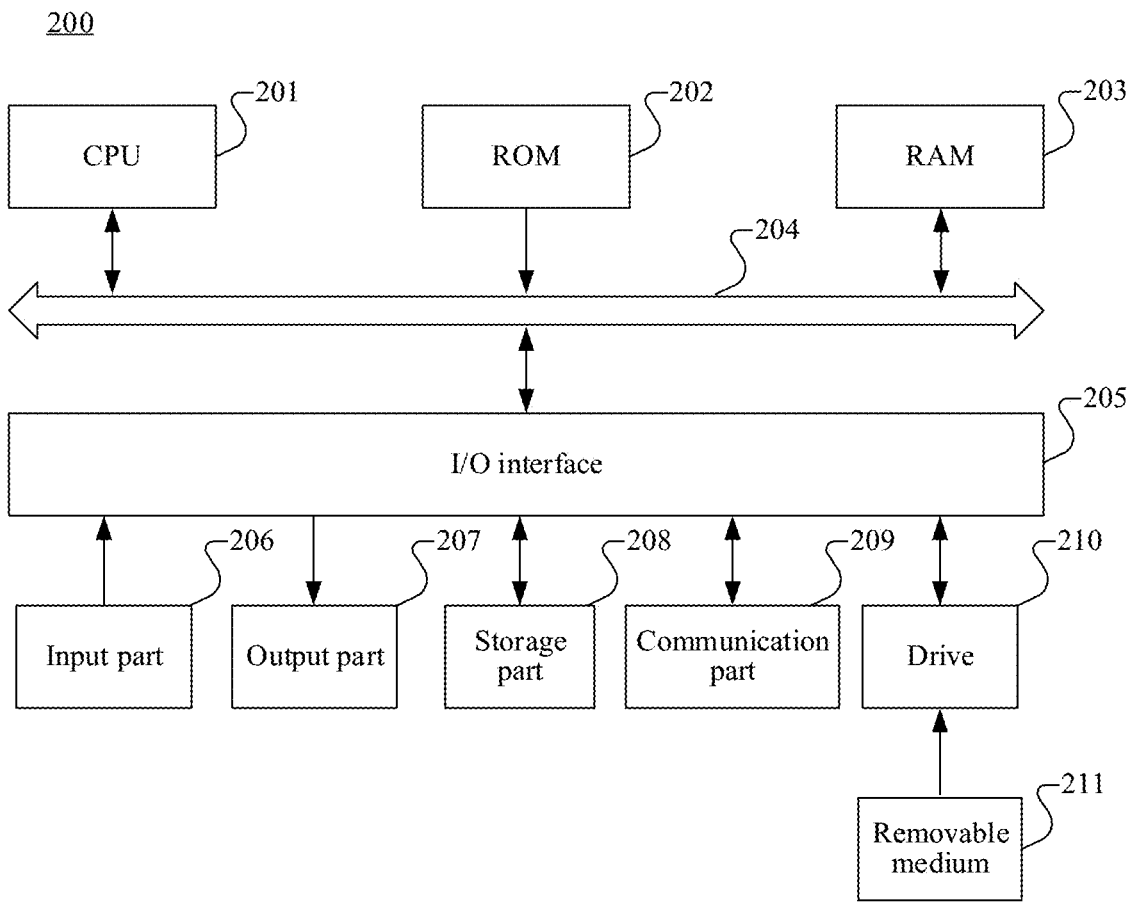
FIG. 2 is a schematic structural diagram of a computer system adapted to implement an electronic device according to some embodiments.

FIG. 2 is a schematic structural diagram of a computer system adapted to implement an electronic device according to some embodiments.

A computer system 200 of the electronic device shown in FIG. 2 is merely an example, and does not constitute any limitation on functions and use ranges of the embodiments of this application.

As shown in FIG. 2, the computer system 200 includes a central processing unit (CPU) 201, which can perform various appropriate actions and processing according to a program stored in a read-only memory (ROM) 202 or a program loaded into a random access memory (RAM) 203 from a storage part 208. The RAM 203 further stores various programs and data required for operating the system. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard, a mouse, or the like; an output part 207 including a cathode ray tube (CRT), a liquid crystal display (LCD), a speaker, or the like; a storage part 208 including a hard disk or the like; and a communication part 209 of a network interface card, including a LAN card, a modem, or the like. The communication part 209 performs communication processing via a network such as the Internet. A driver 210 is also connected to the I/O interface 205 as needed. A removable medium 211, such as a magnetic disk, an optical disk, a magneto-optical disk, a semiconductor memory, or the like, is installed on the drive 210 as needed, so that a computer program read therefrom is installed into the storage part 208 as needed.

Particularly, according to an embodiment of this application, the processes described in the following by referring to the flowcharts may be implemented as computer software programs. For example, this embodiment of this application includes a computer program product, the computer program product includes a computer program carried on a computer-readable medium, and the computer program includes program code used for performing the methods shown in the flowcharts. In such an embodiment, by using the communication part 209, the computer program may be downloaded and installed from a network, and/or be installed from the removable medium 211. When the computer program is executed by the central processing unit (CPU) 201, various functions defined in the embodiments of this application are executed.

The computer-readable medium shown in this application may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM or a flash memory), an optical fiber, a compact disk read-only memory (CD-ROM), an optical storage device, a magnetic storage device, or any appropriate combination thereof. In this application, the computer-readable storage medium may be any tangible medium including or storing a program, and the program may be used by or in combination with an instruction execution system, apparatus, or device. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer readable medium in addition to a computer-readable storage medium. The computer readable medium may send, propagate, or transmit a program that is used by or used in conjunction with an instruction execution system, an apparatus, or a device. The program code contained in the computer readable medium may be transmitted by using any appropriate medium, including but not limited to: a wireless medium, a wire, an optical cable, RF, any suitable combination thereof, or the like.

According to another aspect, this application further provides a computer-readable medium. The computer-readable medium may be included in the electronic device described in the foregoing embodiments, or may exist alone and is not assembled in the electronic device. The computer-readable medium carries one or more programs, the one or more programs, when executed by the electronic device, causing the electronic device to implement the method described in the following embodiment. For example, the electronic device may implement the steps shown in FIG. 3 to FIG. 9.

Figure 3:
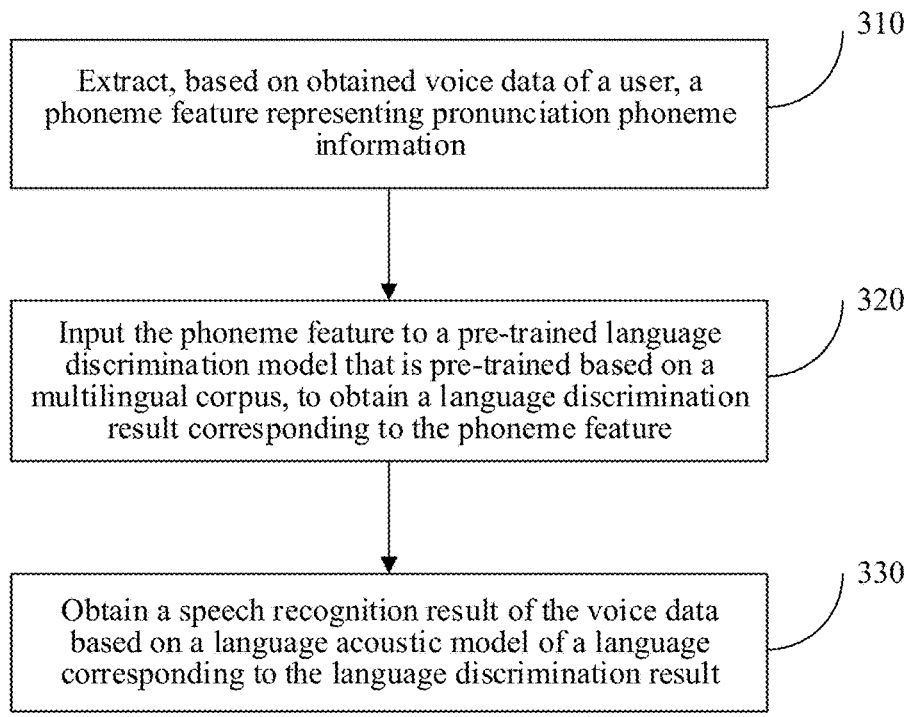
FIG. 3 is a flowchart of a method for speech recognition based on language adaptivity according to some embodiments.

FIG. 3 is a flowchart of a method for speech recognition based on language adaptivity according to an exemplary embodiment. As shown in FIG. 3, the method for speech recognition based on language adaptivity may be performed by any electronic device, and may include the following steps 310 to 330:

Step 310. Extract, based on obtained voice data, a phoneme feature representing pronunciation phoneme information.

The voice data herein is a digitized format data obtained after a voice collection module of the electronic device collects and processes voice of a user. The electronic device, for example, includes, but is not limited to, devices such as a smartphone, a tablet computer, a personal computer, and a notebook computer. The voice collection module, for example, includes components, such as microphones and sound cards, of the electronic devices.

In an embodiment, the electronic device may process the voice data by using a preset feature extraction algorithm, to obtain a corresponding phoneme feature. The phoneme feature represents the pronunciation phoneme information, and a language of the voice data may be recognized based on the phoneme feature. In some implementations, the phoneme feature may be, for example, a bottleneck feature extracted based on a bottleneck layer of a language acoustic model. The bottleneck layer includes pronunciation phoneme information (e.g., data) of a speech segment of the language acoustic model. In some embodiments, the extracted bottleneck feature includes pronunciation phoneme information, such as information on how to pronounce certain vowel(s) and/or consonant(s) for a given language.

Still as shown in FIG. 3, step 320: Input the phoneme feature to a language discrimination model obtained through pre-training based on a multilingual corpus, to obtain a language discrimination result of the voice data.

In the related art, one of the manners of implementing multilingual speech recognition is to manually select the language by the user, so that a speech recognition product can switch to a corresponding language acoustic model for recognition. However, in this way, operation load of the user is increased, and user experience and processing efficiency of speech recognition are reduced.

In this embodiment of this application, based on the extracted phoneme feature, a language to which the voice data belongs can be automatically discriminated, to obtain the language discrimination result of the voice data, to help automatically switch to the language acoustic recognition model corresponding to the language discrimination result subsequently to recognize the voice data.

A phoneme is a minimum phonetic unit obtained through division according to a natural attribute of a speech. In terms of an acoustic property, the phoneme is the minimum phonetic unit obtained through division from a perspective of sound quality. In terms of a physiologic property, one pronunciation action forms one phoneme. For example, a Chinese character [ma] includes two pronunciation actions [m] and [a], which are two phonemes. Sounds made through the same pronunciation action are the same phoneme, and sounds made through different pronunciation actions are different phonemes. For example, in [ma-mi], which comprise two Chinese characters, two [m]'s have the same pronunciation action, and are the same phoneme. [a] and [i] have different pronunciation actions, and are different phonemes.

Phonemes are generally divided into two categories: vowels and consonants. Different pronunciation phonemes may be divided in different languages. Using Mandarin Chinese as an example, 22 consonants and 10 vowels are included. However, the international phonetic symbols of English include a total of 48 phonemes, including 20 vowel phonemes and 28 consonant phonemes.

Correspondingly, in this embodiment of this application, the phoneme feature representing pronunciation phoneme information is extracted from the voice data, and is inputted to the language discrimination model obtained through pre-training based on a multilingual corpus, to discriminate a language to which the voice data belongs. For training of the language discrimination model, reference may be made to the embodiment shown in FIG. 5.

Still as shown in FIG. 3, step 330: Obtain a speech recognition result of the voice data based on a language acoustic model of a language corresponding to the language discrimination result.

As described above, one of the manners of implementing multilingual speech recognition is to support multilingual speech recognition by using a hybrid acoustic pronunciation unit set including a plurality of languages while training an acoustic model. Because pronunciations in different languages can be similar or entirely distinct from one another, an accuracy rate of speech recognition in different languages is greatly affected.

In this embodiment of this application, based on the language discrimination result in step 320, a speech recognition result outputted by a language acoustic model of a corresponding language is obtained according to a discriminated language.

The language acoustic model herein is configured to detect words matching pronunciations from the voice data, thereby determining a subsequent response manner. For example, a corresponding voice command is recognized for interaction with an intelligent device. In an embodiment, the language acoustic model may be obtained by training an initial model using a known corpus and a phoneme feature thereof, and the initial model may be implemented through a neural network such as a convolutional neural network (CNN) or a deep neural network (DNN), or a combined network thereof.

Figure 4:
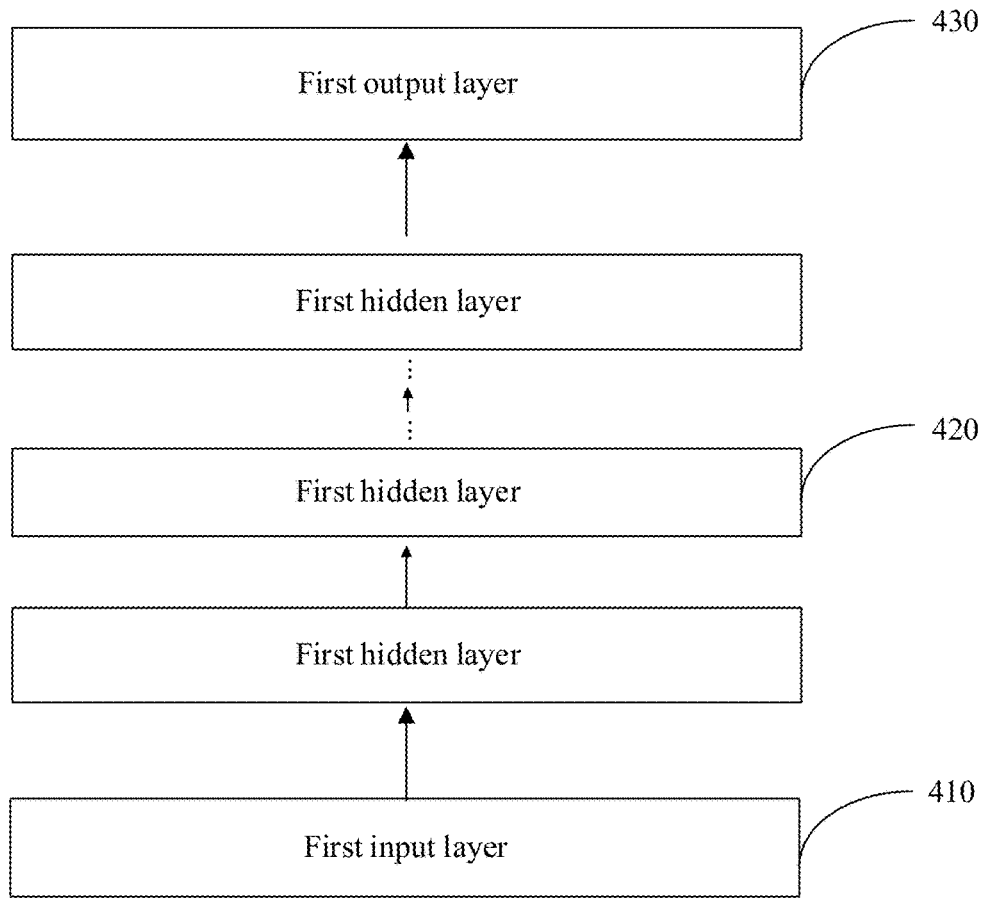
FIG. 4 shows an example of a language acoustic model based on a neural network according to some embodiments.

FIG. 4 shows an example of a language acoustic model based on a neural network. As shown in FIG. 4, the model includes a first input layer 410, a first hidden layer 420 and a first output layer 430. The first input layer 410 is configured to receive input of a phoneme feature, where a quantity of nodes depends on a quantity of phoneme features. The first hidden layer 420 is configured to process the inputted phoneme feature, and may include a plurality of layers of networks (a plurality of sub-hidden layers), where each layer of network may further include a plurality of nodes, a quantity of layers of networks and the quantity of nodes may be determined according to a size of a training corpus and a computing capability of a device, and more layers and nodes indicate higher precision of the model obtained through training. The first output layer 430 includes a plurality of output nodes, for example, which may respectively correspond to different phonemes. In the first output layer 430, an output probability of each node is calculated, and represents a probability that the inputted phoneme feature belongs to a phoneme corresponding to the node. Therefore, based on the first hidden layer 420 with parameters initialized (for example, randomly initialized), the phoneme feature extracted based on the known corpus is inputted to the first input layer 410, and a probability result of the output node in the first output layer 430 is calculated, so that a target loss function (for example, a softmax function) is minimized as an objective, and the first hidden layer 420 capable of accurately expressing the phoneme feature of the inputted corpus may be obtained through training, to obtain a trained language acoustic model. For training of the language acoustic model, reference may be made to the embodiments shown in FIG. 5 and FIG. 6.

The quantity of layers of networks and the quantity of nodes in each layer shown in FIG. 4 are both examples, and the embodiments of this application are not limited thereto.

As described above, to obtain the speech recognition result outputted by the language acoustic model of the corresponding language according to the language discriminated in step 320, in this embodiment of this application, a plurality of language acoustic models are trained using different languages. When the language to which the voice data belongs is discriminated in step 320, the speech recognition result is outputted based on the language acoustic model of the corresponding language in step 330. In this way, when a hybrid language acoustic model is used, a problem of a relatively low recognition rate caused by confusion between pronunciations in different languages can be avoided, thereby improving processing efficiency while ensuring accuracy of speech recognition.

Based on the foregoing embodiment, in the solution for speech recognition based on language adaptivity, language discrimination is performed through the extracted phoneme feature, thereby switching to the language acoustic model of the language corresponding to the language discrimination result, and the speech recognition result of the voice data is obtained based on the language acoustic model of the language corresponding to the language discrimination result. According to different languages, speech recognition may be performed by automatically switching to different language acoustic models, thereby avoiding the problem of a relatively low recognition rate caused by confusion between pronunciations in different languages, thereby improving processing efficiency while ensuring an accuracy rate of speech recognition. In addition, unnecessary operations caused by language selection performed by the user are omitted, and processing efficiency and user experience are improved.

Figure 5:
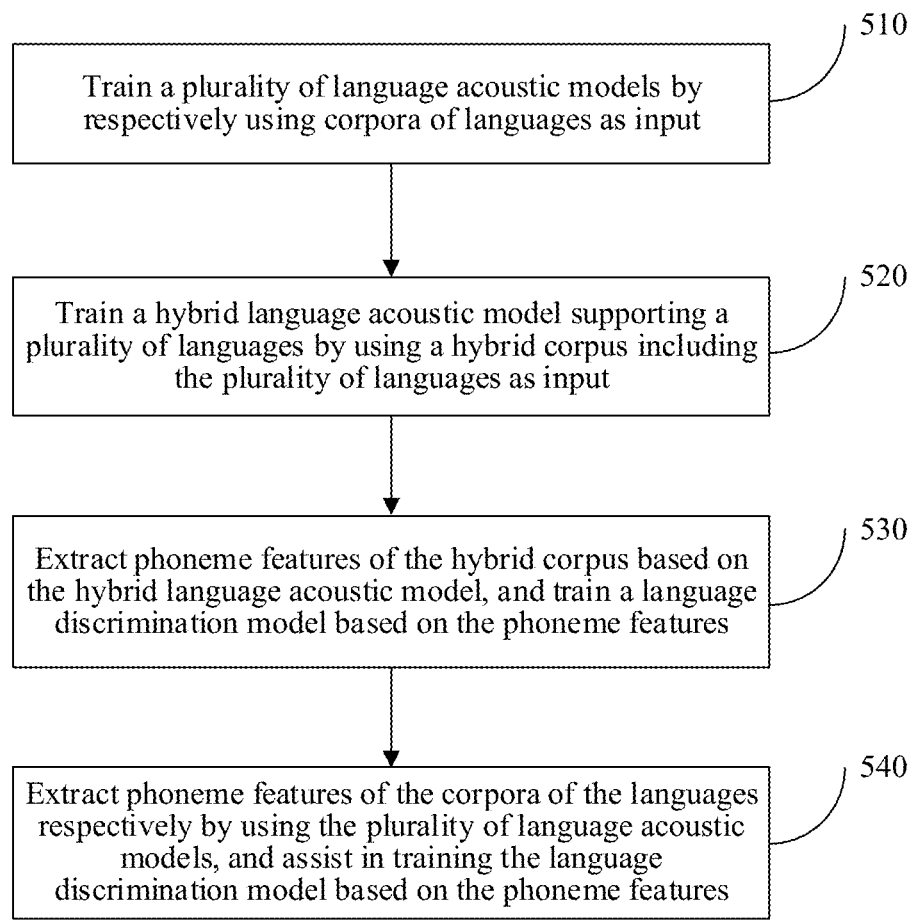
FIG. 5 is a method flowchart of a model training method for speech recognition based on language adaptivity according to some embodiments.

FIG. 5 is a flowchart of a model training method for speech recognition based on language adaptivity according to an exemplary embodiment. As shown in FIG. 5, the model training method for speech recognition based on language adaptivity may be performed by any electronic device, and may include the following steps 510 to 540:

Step 510. Train a plurality of language acoustic models by respectively using corpora of languages as input, the plurality of language acoustic models respectively corresponding to different languages.

In an embodiment, the corpus therein includes a phoneme feature set obtained by performing preprocessing and feature extraction on user speech belonging to each language.

The preprocessing, for example, includes, but is not limited to sample quantization and voice activity detection (VAD) on the user voice. The VAD herein refers to detect whether there is voice in a noisy environment, and may be applied to a speech encoding system, to reduce a speech encoding rate, save communication bandwidth and improve a recognition rate. When the foregoing electronic computing device enables a voice collection function, VAD may be performed on various sounds obtained in the environment through a collection device such as a built-in or external microphone, to detect the user voice therefrom. Next, when the user voice is detected by the electronic device, a start point of the voice is further determined, voice in the environment is further collected, and voice data in a digital form is formed.

After the collected voice is preprocessed, the high-frequency resolution of the voice data is improved, so that the voice data becomes smoother, and subsequent processing of the voice data is facilitated.

The feature extraction, for example, includes but is not limited to, removing redundant parts from the voice data, to extract a parameter that can represent an essential feature of the voice data.

Based on the obtained phoneme feature set, a neural network similar to that shown in FIG. 4 may be used for training, to obtain a language acoustic model of a corresponding language.

Figure 6:
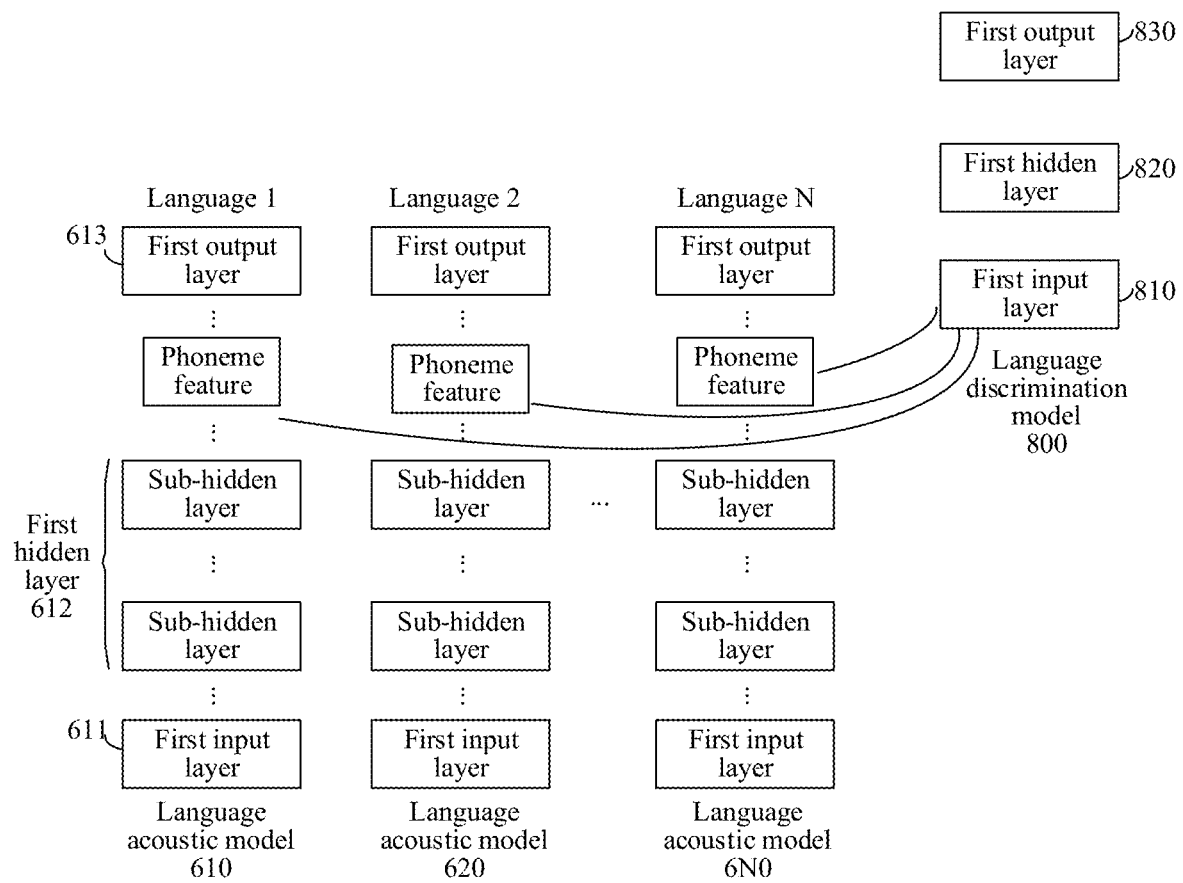
FIG. 6 is a schematic framework diagram of training a plurality of language acoustic models based on step 510 in an embodiment of FIG. 5 according to some embodiments.

FIG. 6 is a schematic framework diagram of training a plurality of language acoustic models based on step 510. As shown in FIG. 6, for a language 1, an extracted phoneme feature set is inputted to a first input layer 611. In the first input layer 611, an output value outputted to a first hidden layer 612 is calculated based on a preset first weight matrix. The first hidden layer 612 includes a plurality of sub-hidden layers, each sub-hidden layer receives an output value of a next sub-hidden layer (or an adjacent first input layer 611), and a weight matrix (for example, a second weight matrix) of the layer may be configured to perform weighted calculation and output a result to a previous sub-hidden layer (or an adjacent first output layer 613). The first output layer 613 includes a plurality of output elements.

In an implementation, each output element of the first output layer 613 corresponds to a pronunciation phoneme included in the language 1. The first output layer 613 receives an output value of an adjacent sub-hidden layer, performs weighted calculation by using a weight matrix (for example, a third weight matrix) of the layer, and further calculates an output probability (for example, a first output probability) based on a result of the weighted calculation by using a loss function. The first output probability represents a probability that the inputted phoneme feature belongs to a pronunciation phoneme to which the first output element belongs. The loss function herein, for example, may include a softmax function.

A target probability value (for example, 0 or 1) that the phoneme feature set extracted based on the known hybrid corpus belongs to the pronunciation phoneme may be predetermined, the weight matrices (respectively the first weight matrix, the second weight matrix, and the third weight matrix) of the first input layer 611, the first hidden layer 612, and the first output layer 613 may be continuously adjusted through the foregoing training process, and finally, a language acoustic model 610 satisfying a preset condition (for example, a quantity of times of training reaches a preset quantity of iterations, or an error from the target probability falls within a preset range) is obtained.

Still as shown in FIG. 6, for a language 2 to a language N, corpora of corresponding languages may be inputted in the same manner, to obtain language acoustic models 620 to 6N0 of corresponding languages through training, and the language acoustic models are configured to obtain speech recognition results of the corresponding languages in step 330. For example, after the language discrimination result in step 320 indicates that current user voice belongs to the language 2, in step 330, a corresponding speech recognition result may be outputted based on the language acoustic model 620. As described above, the speech recognition result herein, for example, may include a specific pronunciation phoneme, in the language 2, that an inputted speech belongs to, and text information that corresponds to the speech and that may be obtained after subsequent further processing. Details are not described herein again.

Step 520. Train a hybrid language acoustic model supporting a plurality of languages by using a hybrid corpus including the plurality of languages as input.

In this embodiment of this application, in addition to respectively training a plurality of language acoustic models corresponding to a plurality of languages through step 510, the hybrid language acoustic model that supports the plurality of languages is also trained. Different from using the hybrid language acoustic model in the related art to perform speech recognition on the user voice that may include a plurality of languages, in this embodiment of this application, the hybrid language acoustic model is configured to support the language discrimination in step 320.

A training process of the hybrid language acoustic model is similar to a training process of the language acoustic model of each language in step 510, and is briefly described below, and details are not described again.

In an embodiment, the hybrid corpus herein, for example, includes a phoneme feature set obtained by performing preprocessing and feature extraction on the user voice in various languages.

Based on the obtained phoneme feature set, a neural network similar to that shown in FIG. 4 may also be used for training, to obtain a final hybrid language acoustic model.

Figure 7:
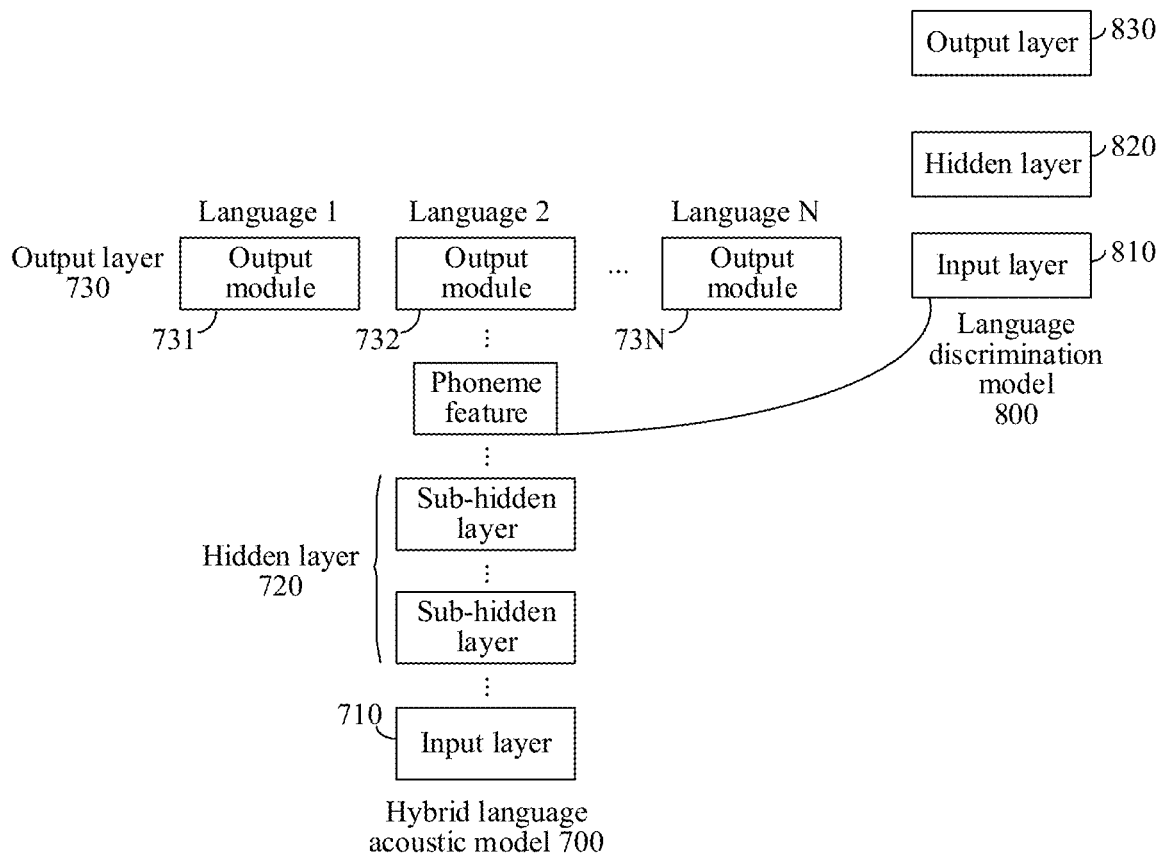
FIG. 7 is a schematic framework diagram of training a hybrid language acoustic model based on step 520 in an embodiment of FIG. 5 according to some embodiments.

FIG. 7 is a schematic framework diagram of training a hybrid language acoustic model based on step 520. As shown in FIG. 7, for a hybrid corpus, the extracted phoneme feature set is inputted to an input layer 710. In the input layer 710, an output value outputted to a hidden layer 720 is calculated based on a preset weight matrix. The hidden layer 720 includes a plurality of sub-hidden layers, each subhidden layer receives an output value of a next sub-hidden layer (or an adjacent input layer 710), a weight matrix of the layer may be used for performing weighted calculation, and a result is outputted to a previous sub-hidden layer (or an adjacent output layer). An output layer 730 includes a plurality of output modules, and each output module includes a plurality of output elements.

In an implementation, output modules 731 to 73N of the output layer 730 respectively correspond to languages from 1 to N, and each output element in the output module corresponds to a pronunciation phoneme included in the language. The output layer 730 receives an output value of an adjacent sub-hidden layer, performs weighted calculation by using a weight matrix of the layer, and then, calculates an output probability based on a result of the weighted calculation by using a loss function. The output probability represents a probability that the inputted phoneme feature belongs to a pronunciation phoneme to which the output element in the output module belongs. The loss function herein may, for example, include a softmax function.

A target probability value (for example, 0 or 1) that the phoneme feature set extracted based on the known corpus belongs to the pronunciation phoneme may be pre-determined, the weight matrices of the input layer 710, the hidden layer 720, and the output layer 730 may be continuously adjusted through the foregoing training process, and finally, a hybrid language acoustic model 700 satisfying a preset condition (for example, a quantity of times of training reaches a preset quantity of iterations, or an error from the target probability value falls within a preset range) is obtained.

Finally, the hybrid language acoustic model 700 obtained through training is configured to obtain the language discrimination result in step 320. For example, based on step 310, a phoneme feature extracted from current user voice is inputted to the hybrid language acoustic model 700, to obtain a probability that the phoneme feature belongs to a pronunciation phoneme to which the output element in the output module belongs, and a probability that the phoneme feature belongs to each language may be obtained correspondingly. As described above, an essential difference between this embodiment of this application and the related art is that, for the user voice that may include a plurality of languages, the user voice is inputted to the hybrid language acoustic model, and an obtained result is not used for outputting a speech recognition result, but is used for determining a language the user voice belongs to, thereby further outputting the speech recognition result based on the language acoustic model of a corresponding language.

Step 530. Extract phoneme features of the hybrid corpus based on the hybrid language acoustic model, and train a language discrimination model based on the phoneme features.

Step 540. Extract phoneme features of the corpora of the languages respectively by using the plurality of language acoustic models, and assist in training the language discrimination model based on the phoneme features.

As described above, in step 510 and step 520, the language acoustic model and the hybrid language acoustic model applied to step 330 and step 320 may be respectively obtained through training.

In an embodiment, this application may further include step 530 and step 540. Based on the phoneme features extracted in the language acoustic model and the hybrid language acoustic model, the language discrimination model is trained to further improve the accuracy rate of language recognition in step 320. However, a person skilled in the art may understand that, other embodiments of this application may not include step 520, and instead, the phoneme feature is extracted in only the language acoustic model in step 510 for subsequent training of the language discrimination model.

After a plurality of language acoustic models and a language discrimination model are obtained through training, the plurality of language acoustic models and language discrimination model may be applied to the embodiment corresponding to FIG. 3, thereby performing speech recognition on the collected voice data based on the plurality of language acoustic models and the language discrimination model.

The language discrimination model includes a second input layer, a second hidden layer, and a second output layer. A training process of the language discrimination model is similar to a training process of the language acoustic model of each language in step 510, and is briefly described below, and details are not described again.

In an embodiment, input of the language discrimination model may include the phoneme features extracted by the language acoustic model and the hybrid language acoustic model. The phoneme feature extracted based on a bottleneck layer may also be trained by using a neural network similar to that shown in FIG. 4, to obtain a final language discrimination model.

With reference to FIG. 6 and FIG. 7, based on the language acoustic models from 610 to 6N0 and the hybrid language acoustic model 700, the extracted phoneme feature is inputted to a second input layer 810. In the second input layer 810, an output value outputted to a second hidden layer 820 is calculated based on a preset fourth weight matrix. The second hidden layer 820 performs weighted calculation by using a weight matrix (for example, a fifth weight matrix) of the layer, and outputs a result to an adjacent second output layer 830. The adjacent second output layer 830 includes a plurality of output elements.

In an implementation, each output element of the second output layer 830 corresponds to a language. The second output layer 830 receives an output value of an adjacent sub-hidden layer, performs weighted calculation by using a weight matrix (for example, a sixth weight matrix) of the layer, and calculates an output probability based on a result of the weighted calculation by using a loss function. The output probability represents a probability that the inputted phoneme feature belongs to a language to which the output element belongs. The loss function herein, for example, may include a softmax function.

A target probability value (for example, 0 or 1) that a phoneme feature extracted based on the known corpus belongs to the pronunciation phoneme may be pre-determined, the weight matrices (respectively the fourth weight matrix, the fifth weight matrix, and the sixth weight matrix) of the second input layer 810, the second hidden layer 820, and the second output layer 830 may be continuously adjusted through the foregoing training process, and finally, a language discrimination model 800 satisfying a preset condition (for example, a quantity of times of training reaches a preset quantity of iterations, or an error from the target probability value falls within a preset range) is obtained.

The final language discrimination model 800 obtained through training may also be configured to obtain the language discrimination result in step 320. For example, based on step 310, for a phoneme feature extracted from current user voice, a phoneme feature therein is inputted to the language discrimination model 800, so that a probability that the phoneme feature belongs to a language to which the output element belongs is obtained.

Based on the model training method for speech recognition based on language adaptivity in the foregoing embodiment, the hybrid language acoustic model or the language discrimination model obtained through training may be configured to determine a language to which the user voice belongs, and further, the speech recognition result can be obtained based on the language acoustic model of the corresponding language, so that not only a accuracy rate of recognition in language is ensured, but also unnecessary operations caused by language selection of the user are omitted, thereby improving processing efficiency and user experience.

Figure 8:
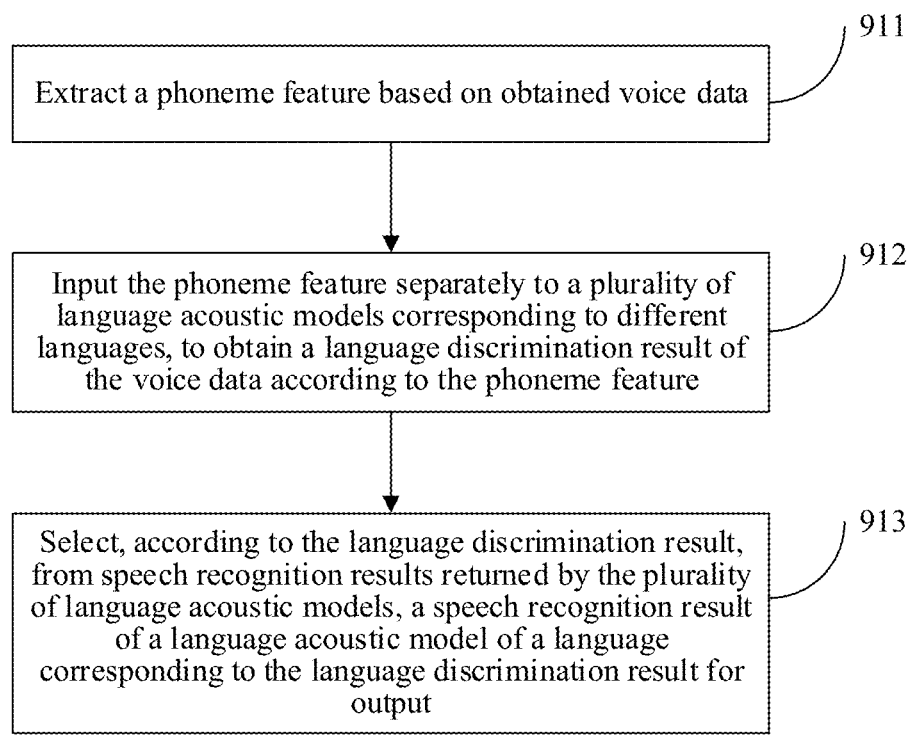
FIG. 8 is a flowchart of a method for speech recognition based on language adaptivity according to some embodiments.

FIG. 8 is a flowchart of a method for speech recognition based on language adaptivity according to another exemplary embodiment. As shown in FIG. 8, the method for speech recognition based on language adaptivity may be performed by any electronic device, and may include the following steps 911 to 913:

Step 911. Extract a phoneme feature based on obtained voice data.

For this step, reference may be made to step 310 of the foregoing embodiment.

Step 912. Input the phoneme feature separately to a plurality of language acoustic models corresponding to different languages, to obtain a language discrimination result of the voice data according to the phoneme feature.

Step 913. Select, from speech recognition results returned by the plurality of language acoustic models, a speech recognition result of a language acoustic model of a language corresponding to the language discrimination result for output.

In this embodiment, the phoneme feature extracted based on step 911 is inputted to a language discrimination model and a plurality of language acoustic models at the same time. The plurality of language acoustic models start processing based on the inputted voice data, and output respective speech recognition results. At the same time, the language discrimination model outputs a language discrimination result based on the inputted phoneme feature. Further, based on the language discrimination result, the speech recognition result of the language acoustic model of the corresponding language is selected from the plurality of language acoustic models for output.

The language discrimination model herein, for example, may be obtained through training based on step 530 and step 540 of the embodiment shown in FIG. 5, and the plurality of language acoustic models, for example, may be obtained through training based on step 510 and step 520 of the embodiment shown in FIG. 5.

With reference to a schematic framework diagram of the plurality of language acoustic models shown in FIG. 6, the extracted phoneme feature in step 911 is inputted separately to the plurality of language acoustic models from 620 to 6N0. Using the model 610 as an example. the foregoing phoneme feature is inputted to the first input layer 611 first. In the first input layer 611, an output value outputted to the first hidden layer 612 is calculated based on a weight matrix obtained through training. The first hidden layer 612 includes a plurality of sub-hidden layers, each sub-hidden layer receives an output value of a next sub-hidden layer (or an adjacent first input layer 611), performs weighted calculation by using the trained weight matrix of the layer, and outputs a result to a previous sub-hidden layer (or an adjacent first output layer 613). The first output layer 613 includes a plurality of output elements, and each output element corresponds to a pronunciation phoneme included in the language 1. The first output layer 613 receives an output value of an adjacent sub-hidden layer, performs weighted calculation by using the trained weight matrix of the layer, and then, calculates an output probability based on a result of the weighted calculation by using a loss function. The output probability represents a probability that the inputted phoneme feature belongs to a pronunciation phoneme to which the output element belongs.

With reference to a schematic framework diagram of the language discrimination model 800 shown in FIG. 6 and FIG. 7, the extracted phoneme feature herein in step 911 is also inputted to the language discrimination model 800 at the same time. The foregoing phoneme feature is inputted to the second input layer 810 first. In the second input layer 810, an output value outputted to the second hidden layer 820 is calculated based on a weight matrix obtained through training. The second hidden layer 820 performs the weighted calculation by using the trained weight matrix of the layer, and outputs a result to the second output layer 830. The second output layer 830 includes a plurality of output elements, and each output element corresponds to a language. The second output layer 830 receives the output value of the second hidden layer 820, performs weighted calculation by using the trained weight matrix of the layer, and calculates an output probability based on a result of the weighted calculation by using a loss function. The output probability represents a probability that the inputted phoneme feature belongs to each language.

Finally, in step 913, based on an output element with a largest output probability in the language discrimination model 800, a language to which the current user voice belongs is determined, and based on this, one of the language acoustic models 620 to 6N0 may be selected to output the speech recognition result. For the speech recognition result outputted by the language acoustic model, text information corresponding to the speech may be obtained after subsequent further processing. Details are not described herein again.

In the solution for speech recognition based on language adaptivity based on the foregoing embodiment, language discrimination is performed through the extracted phoneme feature, speech recognition in a plurality of languages is performed, and the speech recognition result of the voice data is obtained from the language acoustic model of the language corresponding to the language discrimination result. According to different languages, speech recognition may be performed by automatically switching to different language acoustic models, thereby avoiding the problem of a relatively low recognition rate caused by confusion between pronunciations in different languages, thereby improving processing efficiency while ensuring an accuracy rate of speech recognition. In addition, unnecessary operations caused by language selection performed by the user are omitted, and processing efficiency and user experience are improved. In addition, because the speech recognition in different languages is performed while the language discrimination is performed, a processing speed of the speech recognition can be further improved.

Figure 9:
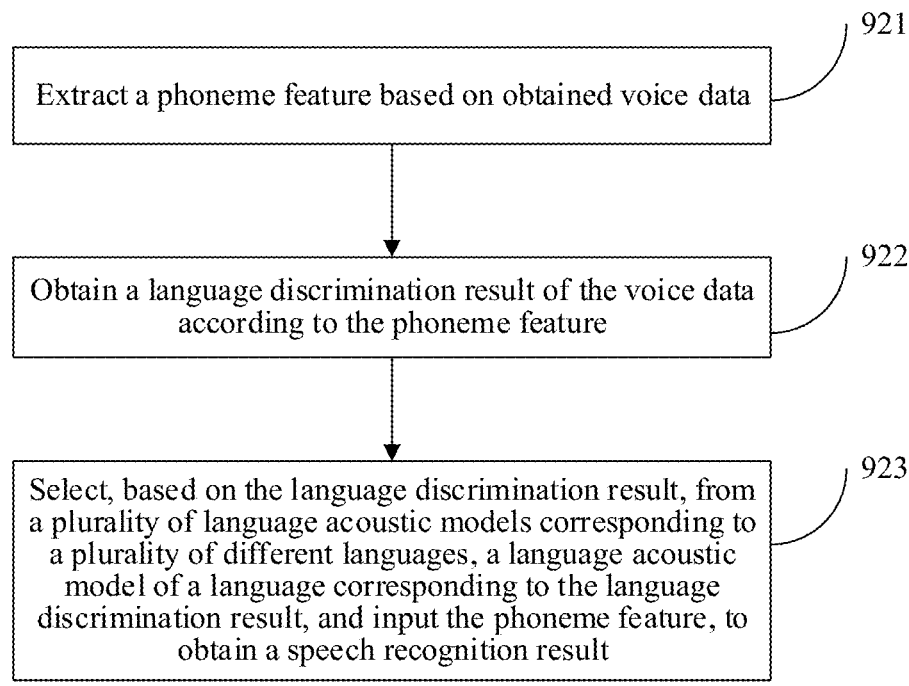
FIG. 9 is a flowchart of a method for speech recognition based on language adaptivity according to some embodiments.

FIG. 9 is a flowchart of a method for speech recognition based on language adaptivity according to still another exemplary embodiment. As shown in FIG. 9, the method for speech recognition based on language adaptivity may be performed by any computing device, and may include the following steps 921 to 923:

Step 921. Extract a phoneme feature based on obtained voice data.

For this step, reference may be made to step 310 of the foregoing embodiment.

Step 922. Obtain a language discrimination result of the voice data according to the phoneme feature.

Step 923. Select, from a plurality of language acoustic models corresponding to different languages, a language acoustic model of a language corresponding to the language discrimination result, and input the phoneme feature, to obtain a speech recognition result.

In this embodiment, the phoneme feature extracted based on step 911 is inputted to the language discrimination model first, and the language discrimination model outputs the language discrimination result based on the inputted phoneme feature, so that a phoneme feature is inputted, according to the language discrimination result, to the language acoustic model of a language corresponding to the language discrimination result, to obtain a corresponding speech recognition result.

The language discrimination model herein, for example, may be obtained through training based on step 530 and step 540 of the embodiment shown in FIG. 5, and the plurality of language acoustic models, for example, may be obtained through training based on step 510 and step 520 of the embodiment shown in FIG. 5.

With reference to a schematic framework diagram of the plurality of language acoustic models shown in FIG. 6, the phoneme feature extracted from the voice data in step 921 is inputted to the language discrimination model 800. First, in the second input layer 810, an output value outputted to the second hidden layer 820 is calculated based on a weight matrix obtained through training. The second hidden layer 820 performs the weighted calculation by using the trained weight matrix of the layer, and outputs a result to the second output layer 830. The second output layer 830 includes a plurality of output elements, and each output element corresponds to a language. The second output layer 830 receives the output value of the second hidden layer 820, performs weighted calculation by using the trained weight matrix of the layer, and calculates an output probability based on a result of the weighted calculation by using a loss function. The output probability represents a probability that the inputted phoneme feature belongs to each language.

In step 923, based on an output element with a largest output probability in the language discrimination model 800, a language to which the current user voice belongs is determined, and based on this, one of the language acoustic models 620 to 6N0 may be selected to input the phoneme feature.

Using an example in which the language discrimination result in step 922 is a language 1, in step 923, based on the language discrimination result, the phoneme feature is inputted to the language acoustic model 610 corresponding to the language 1. The foregoing phoneme feature is inputted to the first input layer 611 first. In the first input layer 611, an output value outputted to the first hidden layer 612 is calculated based on a weight matrix obtained through training. The first hidden layer 612 includes a plurality of sub-hidden layers, each sub-hidden layer receives an output value of a next sub-hidden layer (or an adjacent first input layer 611), performs weighted calculation by using the trained weight matrix of the layer, and outputs a result to a previous sub-hidden layer (or an adjacent first output layer 613). The first output layer 613 includes a plurality of output elements, and each output element corresponds to a pronunciation phoneme included in the language 1. The first output layer 613 receives an output value of an adjacent sub-hidden layer, performs weighted calculation by using the trained weight matrix of the layer, and then, calculates an output probability based on a result of the weighted calculation by using a loss function. The output probability represents a probability that the inputted phoneme feature belongs to a pronunciation phoneme to which the output element belongs.

For the speech recognition result outputted by the language acoustic model, text information corresponding to the speech may be obtained after subsequent further processing. Details are not described herein again.

Based on the solution for speech recognition based on language adaptivity in the foregoing embodiment, language discrimination is performed through the extracted phoneme feature, a language acoustic model of the corresponding language is selected based on the language discrimination result for speech recognition, and a speech recognition result is outputted, thereby avoiding the problem of a relatively low recognition rate caused by confusion between pronunciations indifferent language, thereby improving processing efficiency while ensuring an accuracy rate of speech recognition. In addition, unnecessary operations caused by language selection performed by the user are omitted, and processing efficiency and user experience are improved. In addition, because the speech recognition in languages is performed based on the language discrimination, a processing amount of the speech recognition may be reduced, and processing efficiency is improved.

The following describes apparatus embodiments of this application, which may be used for performing the embodiments of the method for speech recognition based on language adaptivity. For details not disclosed in the apparatus embodiments of this application, refer to the embodiments of the method for speech recognition based on language adaptivity.

Figure 10:
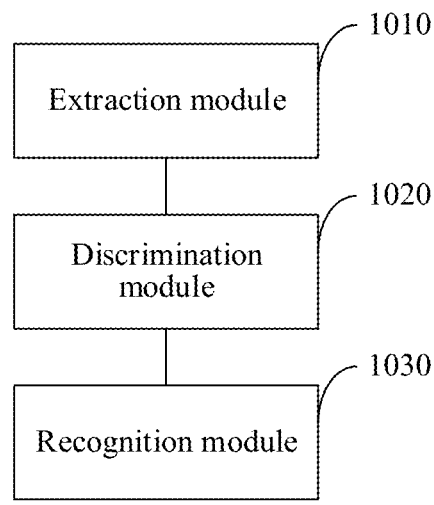
FIG. 10 is a block diagram of an apparatus for speech recognition based on language adaptivity according to some embodiments.

FIG. 10 is a block diagram of an apparatus for speech recognition based on language adaptivity according to an exemplary embodiment. As shown in FIG. 10, the apparatus for speech recognition based on language adaptivity may be performed by any electronic device, and may include the following modules: an extraction module 1010, a discrimination module 1020, and a recognition module 1030.

The extraction module 1010 is configured to extract, based on obtained voice data, a phoneme feature representing pronunciation phoneme information.

The discrimination module 1020 is configured to input the phoneme feature to a language discrimination model obtained through pre-training based on a multilingual corpus, to obtain a language discrimination result of the voice data.

The recognition module 1030 is configured to obtain a speech recognition result of the voice data based on a language acoustic model of a language corresponding to the language discrimination result.

In an embodiment, the extraction module 1010 is further configured to input the phoneme feature separately to a plurality of language acoustic models corresponding to different languages; and the recognition module 1030 is further configured to select, from speech recognition results returned by the plurality of language acoustic models, a speech recognition result of the language acoustic model of the language corresponding to the language discrimination result for output.

In an embodiment, the recognition module 1030 is further configured to select, from a plurality of language acoustic models corresponding to different languages, the language acoustic model of the language corresponding to the language discrimination result, and input the phoneme feature to obtain the speech recognition result.

In an embodiment, based on the foregoing embodiment of the apparatus for speech recognition based on language adaptivity, a recognition model training module is further included, and is configured to train a plurality of language acoustic models by respectively using corpora of languages as input, the plurality of language acoustic models respectively corresponding to different languages; and a discrimination model training module is included, and is configured to extract phoneme features of the corpora of the languages respectively by using the plurality of language acoustic models, and train the language discrimination model based on the phoneme features.

In an embodiment, based on the foregoing embodiment of the apparatus for speech recognition based on language adaptivity, a discrimination model training module is further included, and is configured to train a hybrid language acoustic model supporting a plurality of languages by using a hybrid corpus including the plurality of languages as input, extract a phoneme feature of the hybrid corpus based on the hybrid language acoustic model; and train the language discrimination model based on the phoneme features.

In an embodiment, the language acoustic model includes a first input layer, a first hidden layer, and a first output layer, the recognition model training module being configured to:
input, for a corpus corresponding to each language in the plurality of languages, the extracted phoneme feature to the first input layer;
calculate, based on a preset first weight matrix in the first input layer, an output value outputted to the first hidden layer;
receive, in a plurality of sub-hidden layers included in the first hidden layer, an output value of the adjacent first input layer or a previous sub-hidden layer, perform weighted calculation by using a corresponding second weight matrix, and output a result to an adjacent first output layer or a next sub-hidden layer;
receive an output value of an adjacent sub-hidden layer in the first output layer including a plurality of first output elements, perform weighted calculation by using a third weight matrix, and obtain a first output probability based on a calculation result, the first output probability representing a probability that the inputted phoneme feature belongs to a pronunciation phoneme to which each first output element belongs; and adjust the first weight matrix, the second weight matrix, and the third weight matrix iteratively based on a difference between the first output probability and a target probability, to obtain the language acoustic model satisfying a preset condition.

In an embodiment, the language discrimination model includes a second input layer, a second hidden layer, and a second output layer, the recognition model training module being configured to:

extract, in the plurality of language acoustic models obtained through training, the phoneme feature based on the output value of the first hidden layer, and input the phoneme feature to the second input layer;

calculate, based on a preset fourth weight matrix in the second input layer, an output value outputted to the second hidden layer;

perform weighted calculation in the second hidden layer by using a corresponding fifth weight matrix, and output a result to a plurality of second output elements including in the second output layer;

perform weighted calculation in the second output layer by using a sixth weight matrix, and obtain a second output probability based on a calculation result, the second output probability representing a probability that the inputted phoneme feature belongs to a language to which each second output element belongs; and adjust the fourth weight matrix, the fifth weight matrix, and the sixth weight matrix iteratively based on a difference between the second output probability and the target probability, to obtain the language discrimination model satisfying a preset condition.

In some embodiments, the phoneme feature includes a bottleneck feature. In some embodiments, the bottleneck feature is a phoneme feature representing pronunciation phoneme information of a speech segment of the language acoustic model.

Based on the foregoing embodiment, in the solution for speech recognition based on language adaptivity, language discrimination is performed through the extracted phoneme feature, thereby switching to the language acoustic model of the language corresponding to the language discrimination result, and the speech recognition result of the voice data is obtained based on the language acoustic model of the language corresponding to the language discrimination result. According to different languages, speech recognition may be performed by automatically switching to different language acoustic models, thereby avoiding the problem of a relatively low recognition rate caused by confusion between pronunciations in different languages, thereby improving processing efficiency while ensuring an accuracy rate of speech recognition. In addition, unnecessary operations caused by language selection performed by the user are omitted, and processing efficiency and user experience are improved.

Figure 11:
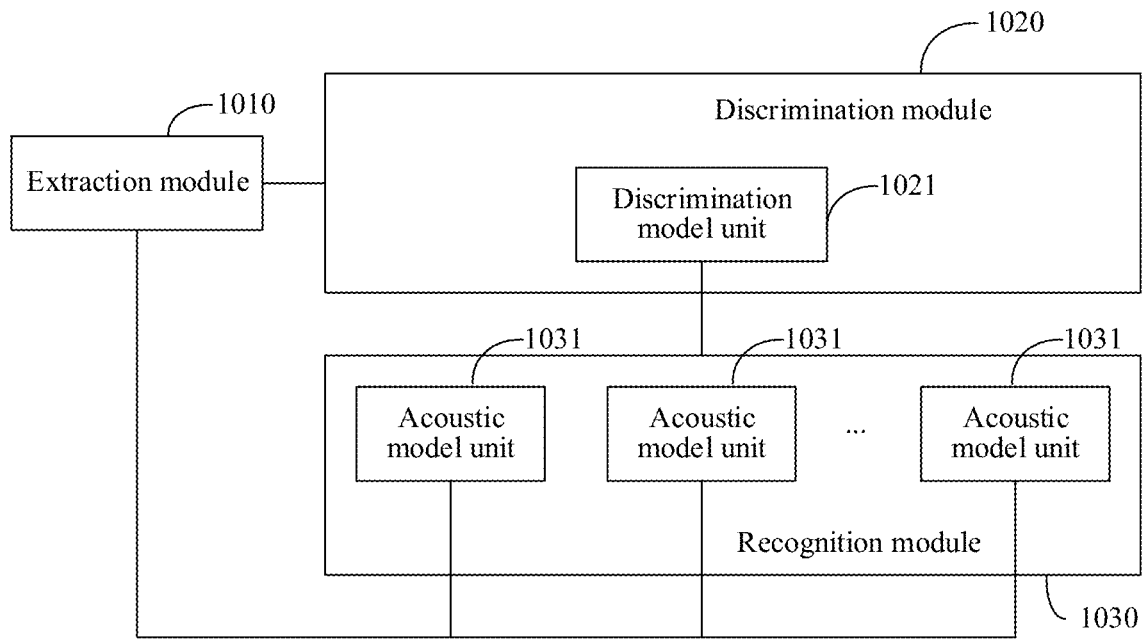
FIG. 11 is a block diagram of an apparatus for speech recognition based on language adaptivity according to some embodiments.

FIG. 11 is a block diagram of an apparatus for speech recognition based on language adaptivity according to another exemplary embodiment. As shown in FIG. 11, the apparatus for speech recognition based on language adaptivity may be performed by any electronic device. Based on the embodiment in FIG. 10, the discrimination module 1020 includes a discrimination model unit 1021, and the recognition module 1030 includes a plurality of acoustic model units 1031.

The acoustic model unit 1031 trains a plurality of language acoustic models by respectively using corpora of languages as input, the plurality of language acoustic models respectively corresponding to different languages. In an embodiment, the recognition module 1030 is further configured to train a hybrid language acoustic model supporting a plurality of languages by using a hybrid corpus including the plurality of languages as input.

The discrimination model unit 1021 extracts phoneme features of the hybrid corpus based on the hybrid language acoustic model, and train a language discrimination model based on the phoneme features. In an embodiment, the discrimination model unit 1021 further extracts phoneme features of the corpora of the languages respectively from the plurality of language acoustic models, and trains the language discrimination model based on the phoneme features.

The recognition module 1030 is configured to perform speech recognition on collected voice data based on the plurality of language acoustic models and the language discrimination model.

In an embodiment, the extraction module 1010 extracts the phoneme feature from the hybrid corpus based on the hybrid language acoustic model trained by the recognition module 1030, and input the phoneme features to the language discrimination model trained by the discrimination model unit 1021, to obtain the language discrimination result.

In an embodiment, the foregoing phoneme feature includes a bottleneck feature.

In an embodiment, the extraction module 1010 respectively transmits the phoneme feature to the plurality of language acoustic models trained by the plurality of acoustic model units 1031, and at the same time, transmits the phoneme feature to the language discrimination model trained by the discrimination model unit 1021, to obtain a language discrimination result. Further, the recognition module 1030 selects, according to the language discrimination result, from speech recognition results returned by the plurality of acoustic model units 1031, a speech recognition result of the language acoustic model of the language corresponding to the language discrimination result for output.

In another embodiment, the extraction module 1010 transmits the foregoing phoneme feature to the language discrimination model trained by the discrimination model unit 1021, to obtain a language discrimination result, and the recognition module 1030 selects, according to the language discrimination result, from the plurality of acoustic model units 1031, the language acoustic model of the language corresponding to the language discrimination result, and inputs the phoneme feature to obtain the speech recognition result.

The solution for speech recognition based on language adaptivity based on the foregoing embodiment, language discrimination, and speech recognition of the plurality of languages are performed through the extracted phoneme feature, thereby switching to the language acoustic model of the language corresponding to the language discrimination result, and the speech recognition result of the voice data is obtained based on the language acoustic model of the language corresponding to the language discrimination result. According to different languages, speech recognition may be performed by automatically switching to different language acoustic models, thereby avoiding the problem of a relatively low recognition rate caused by confusion between pronunciations in different languages, thereby improving processing efficiency while ensuring an accuracy rate of speech recognition. In addition, unnecessary operations caused by language selection performed by the user are omitted, and processing efficiency and user experience are improved.

For the apparatus in the foregoing embodiments, a specific manner in which each module performs an operation is already described in detail in the embodiments related to the method, and details are not described herein again.

Figure 12:
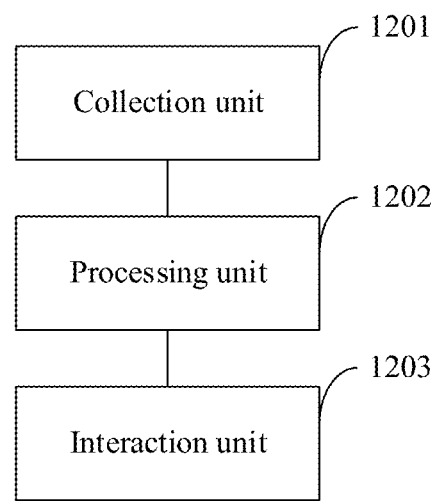
FIG. 12 is a block diagram of a speech interaction device according to some embodiments.

FIG. 12 is a block diagram of a speech interaction device according to an exemplary embodiment. As shown in FIG. 12, the speech interaction device of this embodiment includes a collection unit 1201, a processing unit 1202, and an interaction unit 1203. The speech interaction device herein, for example, may include but is not limited to, any device in a mobile terminal, a smart speaker, a smart television, and a smart wearable device.

In an embodiment, the collection unit 1201 is configured to collect voice data of a user. The collection unit herein for example, may include, but is not limited to, a microphone, a voice collection chip, and the like. Digitized voice data is obtained by performing preliminarily processing on the voice data. In addition, the collection unit 1201 is not limited to only obtaining the voice data of the user, but may further obtain, for example, all environmental sounds, to obtain data that belongs to voice through preliminary analysis and selection.

In an embodiment, the processing unit 1202 is configured to extract, based on the voice data, a phoneme feature representing pronunciation phoneme information; input the phoneme feature to a language discrimination model obtained through pre-training based on a multilingual corpus that includes a plurality of languages, to obtain a language discrimination result of the voice data; and obtain a speech recognition result of the voice data based on a language acoustic model of a language corresponding to the language discrimination result. For the processing of the processing unit 1202, reference may be made to content of the foregoing method embodiments. Details are not described herein again.

In an embodiment, the interaction unit 1203 is configured to present corresponding interaction content to the user based on the speech recognition result of the processing unit 1202. The interaction unit 1203, for example, may include any combination of an image output apparatus and a speech output apparatus. As an example, based on the speech recognition result outputted by the processing unit 1202, the interaction unit 1203 may directly present recognized speech content in a text form. As another example, the interaction unit 1203 may further generate reply content based on the speech recognition result, and present the reply content to the user in a text form and/or a speech form. In another example, if the processing unit 1202 recognizes the voice data of the user as an operation instruction, the interaction unit 1203 may further present an execution result of the operation instruction to the user.

In another embodiment, as a complement to language discrimination of the processing unit 1202, the interaction unit 1203 may be further configured to present the language discrimination result of the processing unit 1202 for the user to perform a selection operation of confirmation or modification. Next, based on the received selection operation of the user, the interaction unit 1203 may notify the processing unit 1202 of adjusting the language discrimination result, and obtain an adjusted speech recognition result from the processing unit 1202.

Based on the speech interaction device in the foregoing embodiment, language discrimination is performed through the extracted phoneme feature, and the speech recognition result of the voice data is obtained based on the language acoustic model of the language corresponding to the language discrimination result. According to different languages, speech recognition may be performed by automatically switching to different language acoustic models, to avoid the problem of a relatively low recognition rate caused by confusion between pronunciations in different language, thereby improving processing efficiency while ensuring accuracy of speech recognition, omitting unnecessary operations caused by language selection of the user, and improving processing efficiency and user experience. When multilingual voice inputs from a plurality of users are received at the same time, automatic recognition at the sentence level can be realized.

Although several modules or units of a device for action execution are mentioned in the foregoing detailed descriptions, the division is not mandatory. Actually, according to the implementations of the present disclosure, features and functions of the two or more modules or units described above may be embodied in one module or unit. Conversely, the features and functions of one module or unit described above may be further divided into a plurality of modules or units to be embodied. The parts displayed as modules or units may or may not be physical units, that is, may be located in one position, or may be distributed on multiple network units. The objective of the solution of the present disclosure may be implemented by selecting some or all of the modules according to actual needs.

While the foregoing embodiments describe several implementations of this application, it should be understood that the foregoing embodiments should not be construed as a limitation to the patent scope of the present disclosure. A person of ordinary skill in the art may further make variations and improvements without departing from the ideas of this application, which all fall within the protection scope of this application. Therefore, the scope of this application is subject only to the appended claims.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs feature extraction, language discrimination, and/or speech recognition. In practical application, the foregoing functions may be allocated to and completed by different functional modules according to requirements, that is, an inner structure of a device is divided into different functional modules to implement all or a part of the functions described above.

What is claimed is:

1. A method for speech recognition based on language adaptivity, comprising:
at a computing device that includes one or more processors and memory, the computing device being communicatively connected to an electronic device via a network communication link:
obtaining, from the electronic device via the network communication link, voice data of a user of the electronic device;
extracting, based on the obtained voice data, a phoneme feature representing pronunciation phoneme information:
inputting the extracted phoneme feature to a pre-trained multi-language discrimination model that is pre-trained based on a multilingual corpus corresponding to multiple languages;
determining, using the multi-language discrimination model, a language discrimination result corresponding to the extracted phoneme feature, the language discrimination result identifying a language to which the voice data belongs;
selecting, from a plurality of language acoustic models corresponding to different languages, a first language acoustic model based on the language discrimination result, the first language acoustic model corresponding to the language to which the voice data belongs;
inputting the extracted phoneme feature into the first language acoustic model to obtain a speech recognition result of the voice data based on the first language acoustic model; and
transmitting, via the network communication link to the electronic device, the obtained speech recognition result, wherein the electronic device is configured to present, to the user of the electronic device, interaction content in the language of the voice data of the user, the interaction content being responsive to the obtained voice data of the user and according to the obtained speech recognition result.

2. The method according to claim 1, further comprising:
training the plurality of language acoustic models using respective corpora of languages as inputs, the plurality of language acoustic models corresponding to different languages;
extracting phoneme features of the corpora of the languages by using the plurality of language acoustic models; and
training the language discrimination model based on the phoneme features.

3. The method according to claim 2, wherein:
the language acoustic model comprises a first input layer, a first hidden layer, and a first output layer; and
training the plurality of language acoustic models further comprises:
inputting, for a corpus corresponding to each language in the plurality of languages, the extracted phoneme feature to the first input layer;
calculating, based on a preset first weight matrix in the first input layer, an output value outputted to the first hidden layer:
receiving, in a plurality of sub-hidden layers comprised in the first hidden layer, an output value of the adjacent first input layer or a previous sub-hidden layer, performing weighted calculation by using a corresponding second weight matrix, and outputting a result to an adjacent first output layer or a next sub-hidden layer;
receiving an output value of an adjacent sub-hidden layer in the first output layer comprising a plurality of first output elements, performing weighted calculation by using a third weight matrix, and obtaining a first output probability based on a calculation result, the first output probability representing a probability that the inputted phoneme feature belongs to a pronunciation phoneme to which each first output element belongs; and
adjusting the first weight matrix, the second weight matrix, and the third weight matrix iteratively based on a difference between the first output probability and a target probability, to obtain the language acoustic model satisfying a preset condition.

4. The method according to claim 3, wherein:
the language discrimination model comprises a second input layer, a second hidden layer, and a second output layer; and
training the language discrimination model based on the phoneme features comprises:
extracting, in the plurality of language acoustic models obtained through training, the phoneme feature based on the output value of the first hidden layer, and inputting the phoneme feature to the second input layer;
calculating, based on a preset fourth weight matrix in the second input layer, an output value outputted to the second hidden layer:
performing weighted calculation in the second hidden layer by using a corresponding fifth weight matrix, and outputting a result to a plurality of second output elements comprising in the second output layer;
performing weighted calculation in the second output layer by using a sixth weight matrix, and obtaining a second output probability based on a calculation result, the second output probability representing a probability that the inputted phoneme feature belongs to a language to which each second output element belongs; and
adjusting the fourth weight matrix, the fifth weight matrix, and the sixth weight matrix iteratively based on a difference between the second output probability and the target probability, to obtain the language discrimination model satisfying a preset condition.

5. The method according to claim 1, further comprising:
training a hybrid language acoustic model supporting a plurality of languages by using a hybrid corpus comprising the plurality of languages as inputs;
extracting phoneme features of the hybrid corpus based on the hybrid language acoustic model; and
training the language discrimination model based on the phoneme features.

6. The method according claim 1, wherein the phoneme feature comprises a bottleneck feature.

7. The method of claim 1 wherein extracting, based on the obtained voice data, the phoneme feature representing pronunciation phoneme information includes:
removing, from the voice data, one or more portions; and
extracting a parameter that represents an essential feature of the voice data.

8. The method of claim 1, wherein the interaction content includes image, text, and voice content.

9. The method of claim 1, further comprising:
after the transmitting, receiving, from the electronic device via the network communication link, a notification to modify the interaction content; and in response to receiving the notification to modify the interaction content:
adjusting the language discrimination result; and
obtaining an adjusted speech recognition result; and
transmitting, via the network communication link to the electronic device, the obtained adjusted speech recognition result.

10. A computer system, comprising:
a communication link that communicatively connects the computer system to an electronic device;
one or more processors; and
memory storing one or more programs for execution by the one or more processors, the one or more programs comprising instructions for:
obtaining, from the electronic device via the network communication link, voice data of a user of the electronic device;
extracting, based on the obtained voice data, a phoneme feature representing pronunciation phoneme information;
inputting the extracted phoneme feature to a pre-trained multi-language discrimination model that is pre-trained based on a multilingual corpus corresponding to multiple languages;
determining, using the multi-language discrimination model, a language discrimination result corresponding to the extracted phoneme feature, the language discrimination result identifying a language to which the voice data belongs;
selecting, from a plurality of language acoustic models corresponding to different languages, a first language acoustic model based on the language discrimination result, the first language acoustic model corresponding to the language to which the voice data belongs:
inputting the extracted phoneme feature into the first language acoustic model to obtain a speech recognition result of the voice data based on the first language acoustic model; and
transmitting, via the network communication link to the electronic device, the obtained speech recognition result, wherein the electronic device is configured to present, to the user of the electronic device, interaction content in the language of the voice data of the user, the interaction content being responsive to the obtained voice data of the user and according to the obtained speech recognition result.

11. The computer system according to claim 10, further comprising instructions for:
training the plurality of language acoustic models using respective corpora of languages as inputs, the plurality of language acoustic models corresponding to different languages;
extracting phoneme features of the corpora of the languages by using the plurality of language acoustic models; and
training the language discrimination model based on the phoneme features.

12. The computer system according to claim 10, further comprising instructions for:
training a hybrid language acoustic model supporting a plurality of languages by using a hybrid corpus comprising the plurality of languages as inputs;
extracting phoneme features of the hybrid corpus based on the hybrid language acoustic model; and
training the language discrimination model based on the phoneme features.

13. The computer system according to claim 12, wherein:
the language acoustic model comprises a first input layer, a first hidden layer, and a first output layer; and
the instructions for training the plurality of language acoustic models further comprises instructions for:
inputting, for a corpus corresponding to each language in the plurality of languages, the extracted phoneme feature to the first input layer;
calculating, based on a preset first weight matrix in the first input layer, an output value outputted to the first hidden layer;
receiving, in a plurality of sub-hidden layers comprised in the first hidden layer, an output value of the adjacent first input layer or a previous sub-hidden layer, performing weighted calculation by using a corresponding second weight matrix, and outputting a result to an adjacent first output layer or a next sub-hidden layer;
receiving an output value of an adjacent sub-hidden layer in the first output layer comprising a plurality of first output elements, performing weighted calculation by using a third weight matrix, and obtaining a first output probability based on a calculation result, the first output probability representing a probability that the inputted phoneme feature belongs to a pronunciation phoneme to which each first output element belongs; and
adjusting the first weight matrix, the second weight matrix, and the third weight matrix iteratively based on a difference between the first output probability and a target probability, to obtain the language acoustic model satisfying a preset condition.

14. The computer system according to claim 13, wherein:
the language discrimination model comprises a second input layer, a second hidden layer, and a second output layer; and
the instructions for training the language discrimination model based on the phoneme features further comprises instructions for:
extracting, in the plurality of language acoustic models obtained through training, the phoneme feature based on the output value of the first hidden layer, and inputting the phoneme feature to the second input layer;
calculating, based on a preset fourth weight matrix in the second input layer, an output value outputted to the second hidden layer:
performing weighted calculation in the second hidden layer by using a corresponding fifth weight matrix, and outputting a result to a plurality of second output elements comprising in the second output layer;
performing weighted calculation in the second output layer by using a sixth weight matrix, and obtaining a second output probability based on a calculation result, the second output probability representing a probability that the inputted phoneme feature belongs to a language to which each second output element belongs; and
adjusting the fourth weight matrix, the fifth weight matrix, and the sixth weight matrix iteratively based on a difference between the second output probability and the target probability, to obtain the language discrimination model satisfying a preset condition.

15. A non-transitory computer-readable storage medium storing instructions that, when executed by one or more processors of a computing device that is communicatively connected to an electronic device via a network communication link, cause the computing device to perform operations comprising:

obtaining, from the electronic device via the network communication link, voice data of a user of the electronic device;

extracting, based on the obtained voice data, a phoneme feature representing pronunciation phoneme information;

inputting the extracted phoneme feature to a pre-trained multi-language discrimination model that is pre-trained based on a multilingual corpus corresponding to multiple languages;

determining, using the multi-language discrimination model, a language discrimination result corresponding to the extracted phoneme feature, the language discrimination result identifying a language to which the voice data belongs;

selecting, from a plurality of language acoustic models corresponding to different languages, a first language acoustic model based on the language discrimination result, the first language acoustic model corresponding to the language to which the voice data belongs;

inputting the extracted phoneme feature into the first language acoustic model to obtain a speech recognition result of the voice data based on the first language acoustic model; and transmitting, via the network communication link to the electronic device, the obtained speech recognition result, wherein the electronic device is configured to present, to the user of the electronic device, interaction content in the language of the voice data of the user, the interaction content being responsive to the obtained voice data of the user and according to the obtained speech recognition result.

16. The non-transitory computer-readable storage medium according to claim 15, the operations further comprising:

training the plurality of language acoustic models using respective corpora of languages as inputs, the plurality of language acoustic models corresponding to different languages;

extracting phoneme features of the corpora of the languages by using the plurality of language acoustic models; and training the language discrimination model based on the phoneme features.

17. The non-transitory computer-readable storage medium according to claim 15, the operations further comprising:

training a hybrid language acoustic model supporting a plurality of languages by using a hybrid corpus comprising the plurality of languages as inputs;

extracting phoneme features of the hybrid corpus based on the hybrid language acoustic model; and training the language discrimination model based on the phoneme features.

* * * * *